US009650906B2

(12) United States Patent
Gore (10) Patent No.: US 9,650,906 B2
(45) Date of Patent: May 16, 2017

(54) SLOTTED LABYRINTH SEAL (71) Applicant: Rolls-Royce Corporation, Indianapolis, IN (US)

(72) Inventor: Patrick E. Gore, Libertyville, IL (US)

(73) Assignee: Rolls-Royce Corporation, Indianapolis, IN (US)

( * ) Notice: Subject to any disclaimer, the term of this patent is extended or adjusted under 35 U.S.C. 154(b) by 126 days.

(21) Appl. No.: 14/201,387

(22) Filed: Mar. 7, 2014

(65) Prior Publication Data

US 2014/0252721 A1 Sep. 11, 2014

Related U.S. Application Data (60) Provisional application No. 61/775,359, filed on Mar. 8, 2013.

(51) Int. Cl.
*F01D 11/02* (2006.01)
*F02C 7/28* (2006.01)
*F16J 15/44* (2006.01)
*F16J 15/447* (2006.01)

(52) U.S. Cl.
CPC ............... *F01D 11/02* (2013.01); *F02C 7/28* (2013.01); *F16J 15/4472* (2013.01); *F16J 15/4476* (2013.01); *F05D 2240/55* (2013.01)

(58) Field of Classification Search
CPC .... F16J 15/447; F16J 15/4472; F16J 15/4476; F02C 7/28; F01D 11/001; F01D 11/005; F01D 11/02; F01D 11/08; F05D 2240/55
See application file for complete search history.

(56) References Cited

U.S. PATENT DOCUMENTS

| 3,957,277 | A |   | 5/1976 | Margnelli |
| 4,199,154 | A | * | 4/1980 | Mueller ................... F16J 15/40 277/420 |
| 4,218,189 | A |   | 8/1980 | Pask |
| 4,458,957 | A |   | 7/1984 | Greener |
| 4,513,975 | A | * | 4/1985 | Hauser ................... F01D 11/02 277/415 |

(Continued)

FOREIGN PATENT DOCUMENTS

| DE | 646436 C | 6/1937 |
| DE | 102006046550 A1 | 4/2007 |

(Continued)

OTHER PUBLICATIONS

International Search Report for PCT/US2014/021902 dated May 26, 2014.

(Continued)

*Primary Examiner* — Nicholas L Foster
(74) *Attorney, Agent, or Firm* — Fishman Stewart PLLC (57) ABSTRACT

A seal for use in a machine, such as a machine with rotating members, includes a labyrinth seal with multiple fins. The seal is slotted and is designed to limit fluid flow to the desired amount from the high pressure side of the seal to the low pressure side of the seal inside partially or exclusively radially extending cavities between two rotating members. The rotating members may operate at different speeds with a common axis of rotation. The seal remains effective when the rotating members move axially in relation to one another despite the fins having a component parallel to the axis of rotation.

19 Claims, 4 Drawing Sheets

(56) References Cited

U.S. PATENT DOCUMENTS

| | | | |
|---|---|---|---|
| 4,919,439 A | 4/1990 | Williams | |
| 5,211,535 A * | 5/1993 | Martin | F01D 11/02 |
| | | | 277/413 |
| 5,218,816 A * | 6/1993 | Plemmons | F01D 11/02 |
| | | | 277/419 |
| 5,222,742 A | 6/1993 | Roberts | |
| 5,538,258 A * | 7/1996 | Hager | F16J 15/164 |
| | | | 277/423 |
| 5,636,848 A * | 6/1997 | Hager | F16J 15/164 |
| | | | 277/420 |
| 6,155,574 A * | 12/2000 | Borgstrom | F16J 15/4474 |
| | | | 277/419 |
| 7,241,109 B2 | 7/2007 | Ferra | |
| 7,430,802 B2 | 10/2008 | Tiemann | |
| 7,527,469 B2 * | 5/2009 | Zborovsky | F01D 9/041 |
| | | | 277/412 |
| 7,862,294 B2 | 1/2011 | Tiemann et al. | |
| 7,874,799 B2 | 1/2011 | Young et al. | |
| 2006/0123797 A1 * | 6/2006 | Zborovsky | F01D 9/041 |
| | | | 60/800 |
| 2012/0027575 A1 | 2/2012 | Manzoori | |
| 2012/0043728 A1 | 2/2012 | Zeng et al. | |
| 2013/0078091 A1 * | 3/2013 | Rees | F01D 11/025 |
| | | | 415/230 |
| 2015/0097342 A1 * | 4/2015 | Morreale | F16J 15/4472 |
| | | | 277/417 |

FOREIGN PATENT DOCUMENTS

| | | |
|---|---|---|
| EP | 1508672 A1 | 2/2005 |
| FR | 763708 A | 5/1934 |

OTHER PUBLICATIONS

English Abstract for DE102006046550A1.
English Abstract for EP1508672A1.

\* cited by examiner

SLOTTED LABYRINTH SEAL

CROSS-REFERENCE TO RELATED APPLICATIONS

This application claims priority to U.S. Provisional Patent Application No. 61/775,359, filed Mar. 8, 2013, the contents of which are hereby incorporated in their entirety.

FIELD OF TECHNOLOGY

A sealing system for machinery, and in particular, a seal applicable to axis-symmetric rotating machinery such as, but not limited to, motors, generators, compressors, turbines, and shafts.

BACKGROUND

Aircraft and other machinery employ seals to control air flow between static and moving parts within the machinery. In particular, in gas turbine engines seals are located in numerous locations such as on rotors, turbines, etc., so as to provide cavities for transitioning fluids to pass therethrough. The transient response of the seal performance can result in fluctuations in pressure within the cavities and in the flows into and out of the cavities. This arrangement can result in additional cooling flow entering the gas path hence reducing engine efficiency and increasing gas path temperatures. This combined with fluctuations in the feed pressure and temperature to cooled turbine blades may result in reduced lives for turbine components. The fluctuations in pressure may also result in a transient increase in the axial load on the thrust bearing locating the engine shaft. Such concern may cause the bearing to have a reduced life or increase its risk of failing.

To prevent undesired radial leakage between concentric streams of fluid, labyrinth seals are used for air-air and air-oil axis-symmetric seals. Labyrinth seals may use a stair-step configuration to discretize partially radial cavities into quasi axial cavities. These seals require close-operating radial clearances in order to accomplish satisfactory sealing. As a result, it is necessary to use extremely accurate manufacturing and assembly techniques which are expensive and time consuming in order to provide acceptably small radial seal clearances at the time of assembly.

Gas turbine engines may also employ seals such as carbon seals which are used almost exclusively for low radius shaft or sump air-oil seal applications, due to the need for cooling of carbon seals in general and the difficulty in manufacturing high radius carbon seals. Carbon seals can also seal in the radial orientation; however, carbon seals must be cooled, usually with oil, on at least one side and become less effective at higher radii and/or lower cooling levels. Such systems require many components and are costly to design and manufacture.

In labyrinth seal embodiments having fins at multiple radii, a load is applied to both rotating members of the seal due to the pressure in the cavity between the fins. The load on the rotor will ultimately be carried by a bearing. It would be helpful to minimize the total load carried by the bearing at all conditions to increase bearing life, enable the use of a smaller bearing, and reduce the heat generated by the bearing. Controlling the load generated in embodiments with fins at multiple radii is one way to accomplish this task, which is one subject of this disclosure.

During operation, mechanical and thermal movements of the gas turbine engine cause relative movement of the sealed components. Thus, the distance between the abutting surfaces of the labyrinth seal changes throughout operation. This can result in periods during operation where the lining and fins are sufficiently close that the air flow through the seal is restricted to an unacceptable level. In the case where the seal has to allow a certain level of purging air flow through the seal, restriction of the low pressure through the seal can lead to hot gas integration causing damage or failure of engine parts.

It would be helpful to solve the problems of radial cavities with labyrinth seals, air-air seals with carbon seals, and high radius seals with carbon seals. It would also be helpful to provide a sealing system and construct that increases performance over standard labyrinth seals, especially at high radii, while utilizing less axial space.

It would further be helpful to provide an enhanced sealing construct that decreases specific fuel consumption and overcomes the poor performance of current high radius seals.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

An exemplary slotted seal is designed to limit fluid flow to the desired amount from the high pressure side of the seal to the low pressure side of the seal inside a partially or exclusively radially extending cavity between two rotating members of different speeds with a common axis of rotation. The exemplary embodiment allows the seal to remain effective when the rotating members move axially in relation to one another despite the fins having a component parallel to the axis of rotation. The rotation is not necessary in either the disk or cover plate members for this exemplary seal system to apply.

An exemplary seal system for a machine includes a passive control of the rotor load generated by the embodiment by varying the radial clearance of each seal fin. As speed increases in an axial compressor or turbine, the rotor fins typically translate radially outwards as compared to the stator slots. At low shaft speeds the radially inner fin is designed with a smaller radial clearance as compared to the outer fin, the inner fin is a more effective seal than the outer fin. At high shaft speeds, the outer fin achieves a smaller radial clearance that the inner fin, becoming a more effective seal. The behavior of the rotor pressure load due to the seal changes in a predictable manner, thereby enabling thermally passive control of the rotor bearing load.

The discussion below is but one example of an improved seal assembly for use in a gas turbine engine. It will be appreciated that the improved seal assembly could be used in other machinery.

Figure 1:
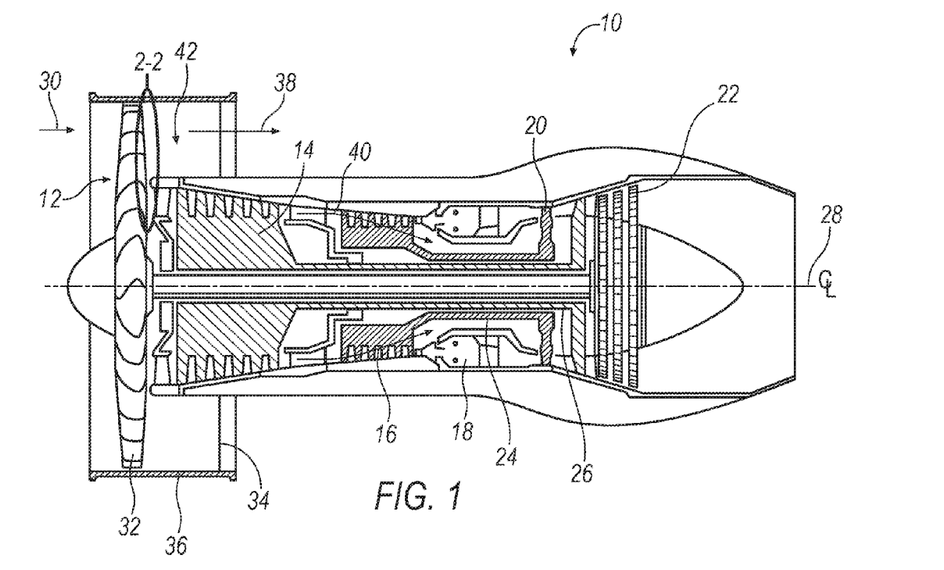
FIG. 1 illustrates a schematic diagram of a machine that could use the present exemplary embodiment, and in particular, a gas turbine engine.

FIG. 1 illustrates a gas turbine engine 10, which includes a fan 12, a low pressure compressor and a high pressure compressor, 14 and 16, a combustor 18, and a high pressure turbine and low pressure turbine, 20 and 22, respectively. The high pressure compressor 16 is connected to a first rotor shaft 24 while the low pressure compressor 14 is connected to a second rotor shaft 26. The shafts extend axially and are parallel to a longitudinal center line axis 28.

Ambient air 30 enters the fan 12 and is directed across a fan rotor 32 in an annular duct 34, which in part is circumscribed by fan case 36. The bypass airflow 38 provides engine thrust while the primary gas stream 40 is directed to the combustor 18 and the high pressure turbine 20. The gas turbine engine 10 includes an improved seal assembly 42 for enhancing fluid flow in high pressure environments.

Figure 2:
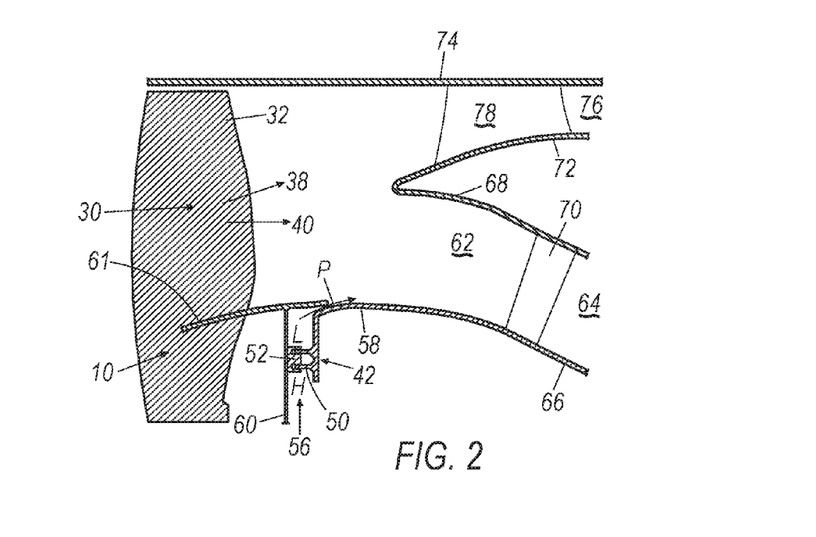
FIG. 2 illustrates an enlarged cross sectional view of fluid flow in a gas turbine engine, depicting one embodiment of a slotted labyrinth seal.

FIG. 2 illustrates an enlarged view taken from the circle 2-2 if FIG. 1, illustrating the construct of a gas turbine arrangement just downstream of the fan 32 where the fan air 30 is redirected to a bypass air stream 38 and core air stream 40. The enlarged view further depicts the construct of the gas turbine engine 10 having a seal assembly 42 of the exemplary embodiment. The seal assembly 42 is shown mounted on one side to a static inner wall 58, and on the other side to a dynamic moving wall 60 that operates at fan speed. The wall 60 extends from an inner casing wall 61 that directs airflow from the fan 32. Thus, the seal assembly 42 contemplates on one side a dynamic component and on the other side a static component as the engine 10 operates.

The exemplary seal assembly 42 is an improved labyrinth seal having a unique slotted configuration which consists of a fin 50 and a runner 52 with a set clearance 54 between them regulating the fluid flow 56 through the seal assembly 42. The high pressure H fluid flow traverses radially outwardly through the seal 42 towards a lower pressure region L where the low pressure air L escapes through a passage P and joins the core air stream 40. In particular, the high pressure H fluid flow 56 passes through the seal assembly 42 between the static member 58 and the dynamic member 60. The fluid flow 56 bleeds into core flow 40 into a first channel 62 towards the core 64 of the engine. The first channel 62 has an inner gas wall 66 that is static and an opposing outer wall 68. Guide vanes 70 are positioned within the first channel 62 for controlling fluid flow to the core 64 of the engine.

The bypass flow 38 is split from the core air flow 40 by an inner bypass case 72. An opposing outer bypass case 74 forms a bypass duct 76 with a guide vane 78 disposed therein for controlling airflow in the bypass duct 76. The fan 32 rams air into both the first channel 62 and the bypass duct 76.

Figure 3:
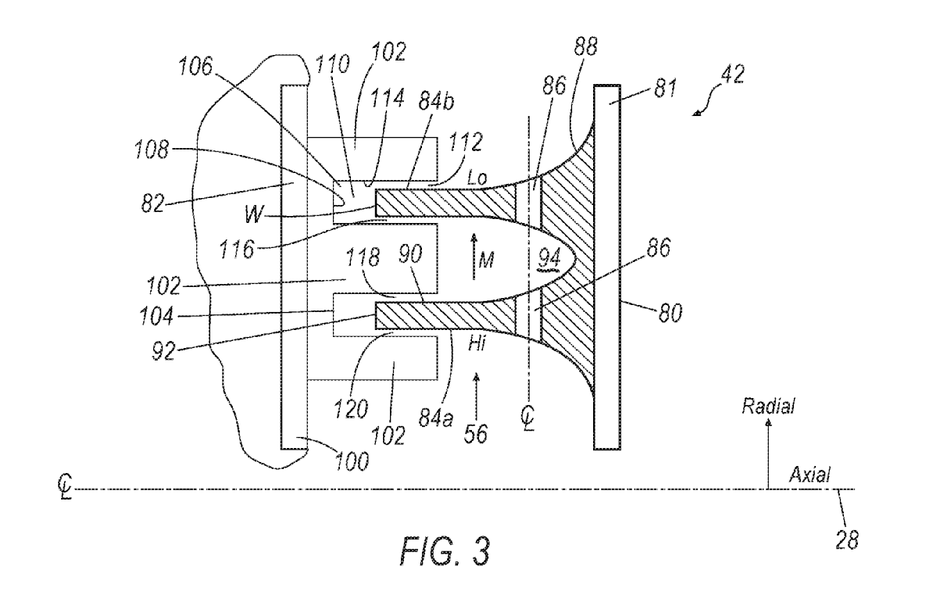
FIG. 3 illustrates an enlarged diagram of the FIG. 2 seal, showing features of the improved seal.

With reference to FIG. 3, an enlarged top plan view of an exemplary arrangement of a seal assembly 42 is depicted. This could be the seal assembly 42 that is depicted in FIG. 2, or perhaps another application, for example machinery other than a gas turbine engine 10. In this example, however, two moving members, such as a disk 80 and cover plate 82, are provided as example of a location where the novel seal assembly 42 could be employed. By contrast, the example shown in FIG. 2 demonstrates the employment of the seal assembly 42 in an application where a static member 58 and dynamic member 60 are contemplated. Thus, the seal assembly 42 is universal and can be used in numerous applications about a gas turbine 10 or other machinery.

With continued reference to FIG. 3, a disk 80 has a base 81 with a pair of outwardly depending knives or fins 84a and 84b that extend a substantial distance into one or more cavities of the cover plate 82. While a pair of fins 84 are depicted, it will be appreciated that more or fewer fins 84 could be employed. Such varied arrangement will aid in restricting the fluid flow 56 passing across the seal assembly 42. Apertures 86 may be optionally provided extending through a portion 88 of each fin 84 and their size may be varied so as to provide different fluid flow 56 therethrough. The apertures 86 will aid in distribution of fluid pressure as the fluid flow 56 traverses from a high pressure region H to a low pressure region L.

In the embodiment shown, the geometric construct of the fin 84 is that it includes an axially extended, constant-width 90 that protrudes a substantial distance into a cavity of the cover plate 82. A generally square shaped tip 92 can be provided at a distal end of each fin 84a and 84b while a curved interior configuration 94 may be provided at the end opposite the tip 92. The fin 84 could be coated with a material, such as an abrasive material, for enhanced wearability characteristics. Each fin 84 may have a width W and a length L, where the length L may be measured from the tip 92 to the base 81, which it will be appreciated could vary based on performance preferences.

The cover plate 82 is a rotating member and it includes a base 100 from which several outwardly depending runners 102 are provided. The runners 102 are separated by a first cavity 104 and a second cavity 106 that are operable to receive fins 84a and 84b, respectively. It will be appreciated that more or less cavities could be contemplated by this disclosure. Each cavity has a land 108, and a slightly larger width than the width W of the corresponding fin in which it receives. The depth of the cavity is such that the tip 92 of each fin 84 does not engage the land 108, thus providing axial clearance 110 therebetween during operation of the machine. A side or radial clearance 112 is maintained between the outer side wall of the fin 84b and the side wall 114, while providing another clearance 116 on the opposing side of the construct. Likewise, fin 84a has a clearance 118 and 120 that may vary within the cavity as the machine operates. Thus, the seal assembly 42 provides for axial clearances 110 and radial clearances 112, 116, 118 and 120. The ability to hold the radial clearances is provided with this exemplary embodiment as are other benefits of the design. FIG. 3 depicts potential clearances during a static or powered mode of operation.

Figure 4:
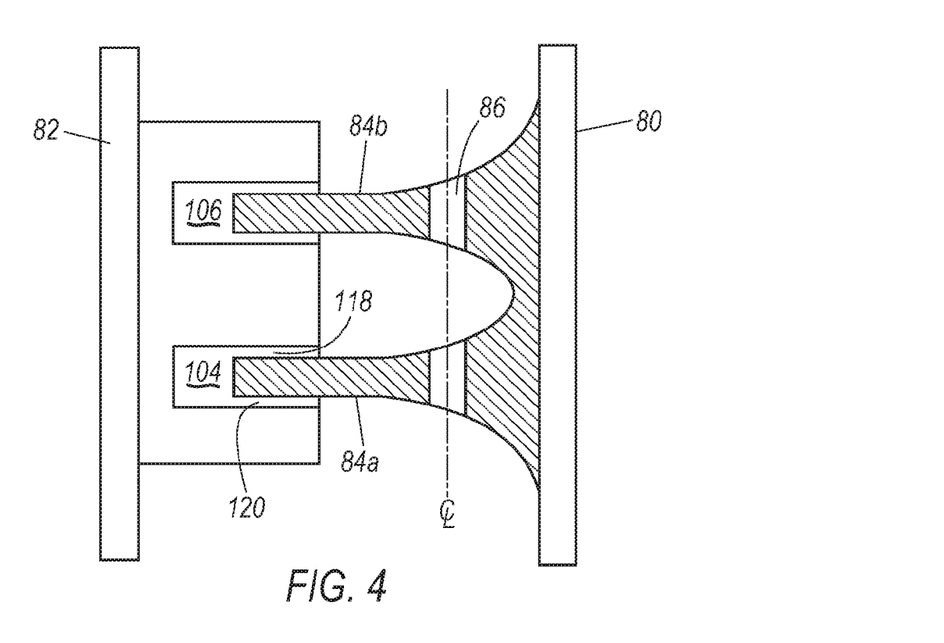
FIG. 4 illustrates an enlarged diagram of the FIG. 3 device, but shown with the clearances during a mode of operation.

FIG. 4 depicts one exemplary view of the seal assembly 42 during a mode of operation of the machine 10, for example a low power mode of operation. During this condition, the inner fin 84a has a tight inner radius clearance 120 as opposed to the clearance during the mode shown in FIG. 3. Such arrangement causes the fluid flow 56 through the seal assembly 42 to decrease as compared to FIG. 3. During this operation, the pressure between fins 84*a* and 84*b* could be low and the load on the rotor of the machine likewise could be low.

Figure 5:
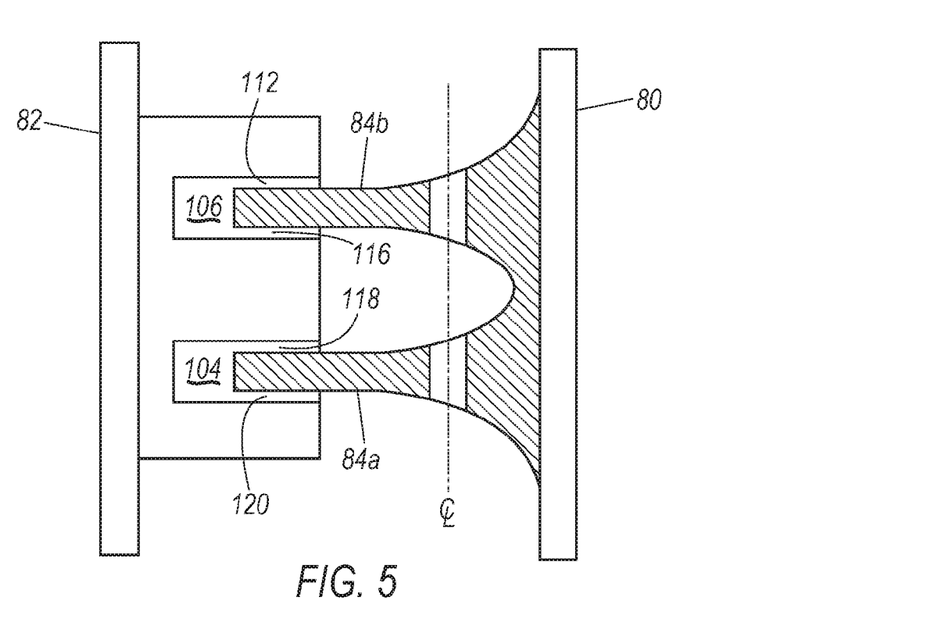
FIG. 5 illustrates an enlarged diagram of the FIG. 3 device, but shown with the clearances during an alternate mode of operation.

FIG. 5. depicts an alternative mode of operation to FIG. 4 of the machine 10, for example a high power mode of operation. During this alternate mode of operation, the outer fin 84*b* has a tight outer radius clearance 112 while the inner fin 84*a* has a standard inner radius clearance 120. On this operation condition, the fluid pressure between the fins 84*a* and 84*b*, and thus the load on the rotor, is higher than that when compared to the operation condition that is exhibited in the FIG. 4 operational situation. It will be appreciated that the assembly may operate at various clearance positions, for example those shown in FIG. 3, 4, or 5, or variations thereof.

It will be appreciated that the runner 102 may be constructed of a material that is more abradable than the fin 84, or the fin be constructed of material that is more abradable than the runner 102. By using a runner 102 that is more abradable than the fin 84*a*, or vice versa, a small clearance can be formed between the fin and the cavity in the runner without concern for damage to the runner 102 or the fin 84. It will also be appreciated that runner 102 may be constructed out of a material comprising a multitude of honeycomb cells.

By the constant-width fin extending within the corresponding constant width cavity, such arrangement allows the seal assembly 42 to be maintained when the rotating members (80 and 82 in this embodiment) translate axially relative to one another. The clearances between the fin and cavity allow a predictable amount of flow 56 to move through the seal assembly 42 regardless of the relative movement of the rotating members. Likewise, the placement of the holes 86 in the fin base 88, where the fin base 88 is wider than the cavity 104 in the runner 102, keeps the holes 86 from being blocked by the runner 102. Such arrangement aids in fluid flow 56 through the seal.

Figure 6:
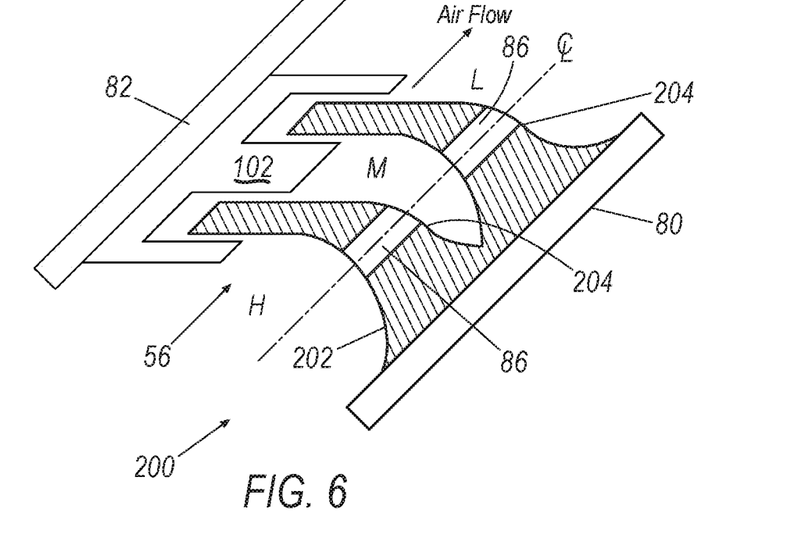
FIG. 6 illustrates an alternative embodiment of a slotted seal, showing a reinforced curved fin configuration.

FIG. 6 illustrates an alternative seal assembly 200 having curved and/or reinforced fins 202 with refined geometry that enhance performance and/or adapt the seal assembly 200 for use in semi-axial cavities. For example, the area near the optional holes 86 may be reinforced with additional material 204 to better withstand the forces generated by turbulent air flow and pressure loading as the fluid flow 56 traverses through the seal from high pressure H to medium pressure M to lower pressure L. The use of curved fins 202 in seal assembly 200 allow axial movement between coverplate 82 and disk 80 with no impact to fluid flow 56, enabling the application of the slotted seal to cavities that have a component in the axial direction.

Figure 7:
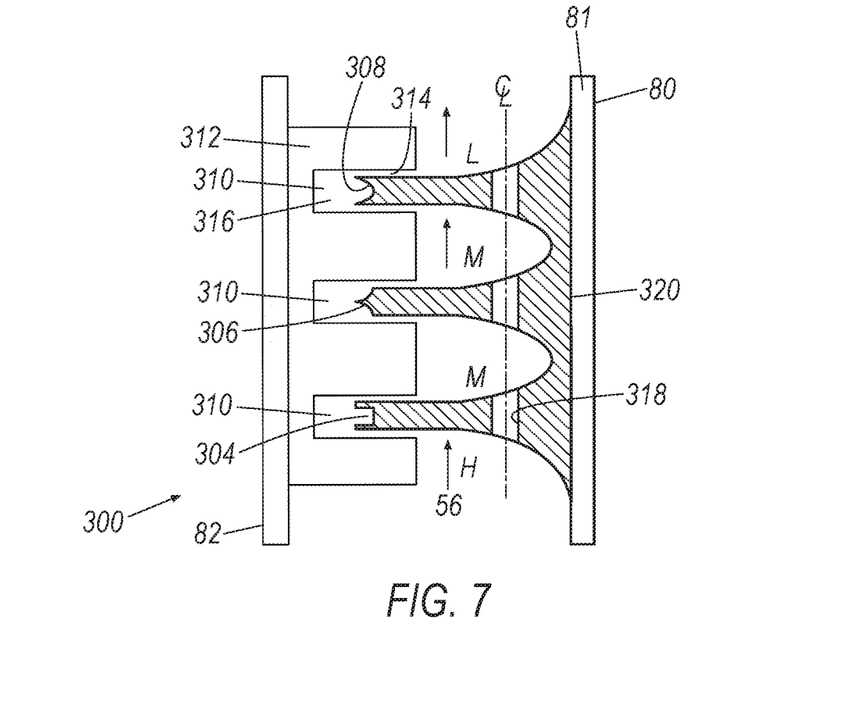
FIG. 7 illustrates an enlarged diagram of another alternative embodiment of a slotted seal, showing various fin tip configurations that could be employed.

FIG. 7 illustrates another alternative seal assembly 300 having a plurality of fins and cavities which provide an alternative performance to the construct that is depicted in the FIG. 3 embodiment. In addition, the assembly 300 offers fins 302 having tips of varying geometry, each of which provides different performance features. For example, tip 304 may have a U-shaped configuration located at its distal end. Tip 306 may have a pointed configuration located at its distal end, while tip 308 may have a concave-shaped configuration. A plurality of cavities 310 located within a runner 312 provide a space for each such tip to move within. Radial clearances 314 and axial clearances 316 are maintained as discussed above and will not be repeated here. Orifices 318 extend through a base 320 of the disc 80 for modifying fluid flow. A high pressure region H forms a part of the fluid flow 56. A pair of moderate pressure regions M are contemplated along with the low pressure region L.

The exemplary seals 42, 200 and 300 make it possible to have highly effective, manufacturable, reliable, predictable seals in cavities extending in the radial or semi-radial direction. This is an improvement over other seal designs with fins in the radial orientation because this allows for axial movement while keeping the desired seal clearance between the tip and the runner and therefore flow rate. The improved seal allows for movement in the axial direction while keeping the desired flow rate using fins in the axial direction, enabling effective sealing in cavities that extend radially or semi-radially.

The proposed embodiments provide a performance improved seal due to the increased "turning" losses that the flow will encounter. The amount of air needed to maintain a seal and increase the pressure drop across that seal is decreased. This means that sealing can be accomplished with less of a performance decrease than via other sealing methods. This translates directly to better specific fuel consumption.

The preferred embodiments extend further radially than axially; as such the seal is particularly well suited for tight axial spaces, such as near rotors, preswirlers, or the rear of the fan. This radial nature of the design is expected to result in reduced weight, complexity, cost, and geometric constraints. Other types of seals may be longer in the axial direction than the radial direction, often requiring the addition of flanges, complex geometry, and cost in order to be geometrically applicable in tight spaces.

The embodiments disclosed herein have a maximum clearance. Such clearance allows slotted seals to perform at least as well as labyrinth seals, especially at high radii. Additionally, the exemplary seal assemblies 42, 200 and 300 can also be designed to take advantage of thermal movements between power settings. Unlike standard labyrinth seals which decrease in seal clearance as the power increases, the improved seal assemblies 42, 200 and 300 can be designed to increase in clearance as the power increases if desired. This can be useful in avoiding oil leaks at low power settings. The improved seal assemblies also decrease the likelihood of oil leaks because there is no direct path for oil to move through the seal, as is the case for both labyrinth and carbon seals.

It will be appreciated that rotating members (the disk) can be machined with the fins as a part of the rotating member, including the orifices if necessary. Likewise, the rotating member (cover plate) can have the runners attached thereto via various methods including welding, brazing, or riveting. The runners, which can be made of many materials such as an abradable and/or honeycomb, can be precut with the slots for the fins. The runners may be coated; likewise the fins could be coated. Al oxide could be one sample coating material. For assembly, the fins may be axially inserted an appropriate depth into the slots in the runners.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

What is claimed is:

1. A seal for a machine, the seal comprising:
a first rotating member having a cavity formed between a first runner and a second runner that extend axially in a first linear direction from the first rotating member;
a second rotating member having at least one fin with outer and inner surfaces tapering transversely toward each other and extending axially to a distal end in a second linear direction from the second rotating member and toward the first rotating member, the fin having a base section with the outer and inner surfaces at the base section spanning wider than the cavity, the fin having a tapered section extending from the base section towards the first rotating member, the tapered section having an aperture extending between the outer and inner surfaces at the tapered section, the fin having an elongated section with an axial length and a radial width, wherein the length of the elongated section extends axially from the tapered section to the distal end of the fin and into the cavity between the first runner and the second runner, wherein the width of the elongated section is generally uniform, wherein the length of the elongated section of the fin is larger than an axial length of the cavity, and wherein blockage of the aperture by at least one of the first and second runners is resisted due to the length of the elongated section being greater than the length of the cavity and due to a width of the tapered section being greater than a radial width of the cavity;
a first clearance between the cavity and the fin; and
a second clearance between the cavity and the fin,
wherein said first and second rotating members are arranged to rotate at different speeds about a common rotational axis.

2. The seal as claimed in claim 1, wherein the first or second rotating member is more abradable than the other.

3. The seal as claimed in claim 1, wherein the first or second rotating member is coated with a material.

4. The seal as claimed in claim 1, wherein the first rotating member comprises a cover plate and the second rotating member comprises a disk.

5. The seal as claimed in claim 1, wherein the width of the elongated section of the fin is constant and the cavity is larger than the width of the fin.

6. The seal as claimed in claim 1, wherein the first and second rotating members allow for axial movement therebetween, and the rotating members are operable to preserve adequate fluid flow to maintain sealing.

7. The seal as claimed in claim 1, wherein the fin defines a first region on one side thereof and a second region on a second side thereof opposite the first region, and the aperture is for providing fluid flow from the first region to the second region.

8. The seal as claimed in claim 1, wherein the distal end of the fin includes a leading surface in the second linear direction, and has a geometric configuration including at least one of a u-shape, a pointed-shape, or a concave-shape.

9. The seal as claimed in claim 1, further comprising additional fins and additional cavities that are operable to receive said additional fins.

10. The seal as claimed in claim 1, wherein the first and second clearances are not the same.

11. The seal as claimed in claim 1, wherein the fin has a curved profile in the tapered section for enhancing sealing relative to the cavity.

12. The seal as claimed in claim 1, wherein the fin extends into the cavity about ½ the axial length of the cavity.

13. The seal as claimed in claim 1, wherein the machine is a gas turbine engine.

14. The seal as claimed in claim 1, wherein as the machine operates, the first and second clearances of the fin vary.

15. A seal for an engine comprising:
a rotating cover plate;
a first runner, a second runner and a third runner extending axially in a first linear direction from the cover plate and forming a first cavity and a second cavity;
a rotating disk;
a first fin and a second fin, each having outer and inner surfaces tapering transversely toward each other and extending axially to a distal end in a second linear direction from the disk and toward the cover plate, each fin having a base section with the outer and inner surfaces at the base section spanning wider than a corresponding one of the first and second cavities, each fin having a tapered section extending from the base section towards the corresponding one of the first and second cavities, each fin having an elongated section extending axially from the tapered section to the distal end of the fin and into the corresponding one of the first and second cavities; and
wherein the first and second fins are arranged to form a low pressure region on one side of the first fin, an intermediate pressure region between the first and second fins, and a high pressure region formed on one side of the second fin, and are located between the cover plate and the disk; and
a first aperture formed in the tapered section of the first fin extending between the outer and inner surfaces of the first fin at the tapered section of the first fin and a second aperture formed in the tapered section of the second fin extending between the outer and inner surfaces of the first fin at the tapered section of the first fin, the apertures arranged to provide fluid flow through the first fin via the first aperture and through the second fin via the second aperture;
wherein a first radial clearance of the first fin is different than a second radial clearance of the second fin, and wherein an axial length of the elongated section of each fin is larger than an axial length of each cavity, and wherein blockage of each aperture by the runners is resisted due to the length of the elongated section of each fin being greater than the length of each corresponding cavity and due to a radial width of the tapered section of each fin being greater than a radial width of each corresponding cavity.

16. The seal as claimed in claim 15, wherein at least one of the fins is reinforced to have additional material at a section that is subject to increased pressure on the at least one of the fins.

17. A seal for use in sealing two structures in a gas turbine engine, the seal comprising:
a slotted runner extending axially in a first linear direction from a first rotating member, the slotted runner having a first cavity and a second cavity, each of the cavities having an elongated rectangle-shaped profile, the first rotating member configured to rotate at a first speed about an axis; and
a pair of fins, each having outer and inner surfaces tapering transversely toward each other and extending axially to a distal end in a second linear direction from a second rotating member and toward the first rotating member, each fin having a base section with the outer and inner surfaces at the base section spanning wider than a corresponding one of the first and second cavities, each fin having a tapered section extending from the base section towards the first rotating member, each fin having an elongated section extending axially from the tapered section and into the respective elongated rectangle-shaped profile of the corresponding one of the first and second cavities, the second rotating member configured to rotate at a second speed about said axis;

wherein the pair of fins are arranged to vary a radial clearance between an outside surface of each fin and a wall of each corresponding cavity, and wherein an axial length of the elongated section of each fin is larger than an axial length of each corresponding cavity, and wherein blockage of each aperture by the slotted runner is resisted due to the length of the elongated section of each fin compared to the length of each corresponding cavity and due to a radial width of the tapered section of each fin being greater than a radial width of each corresponding cavity.

18. The seal as claimed in claim 17, further comprising an additional cavity in the slotted runner and an additional fin extending from said second rotating member that is operable to protrude into the additional cavity.

19. The seal as claimed in claim 17, further comprising an aperture in each of the fins such that fluid flow passes from one side of the pair of fins, between the pair of fins, and to an other side of the pair of fins.

\* \* \* \* \*